(12) United States Patent
Roeder

(10) Patent No.: US 12,615,343 B2
(45) Date of Patent: Apr. 28, 2026

(54) DYNAMIC RESOLUTION SWITCHING IN LIVE STREAMS BASED ON VIDEO QUALITY ASSESSMENT

(71) Applicant: iStreamPlanet Co., LLC, Las Vegas, NV (US)

(72) Inventor: Steven Roeder, Fremont, CA (US)

(73) Assignee: iStreamPlanet Co., LLC, Las Vegas, NV (US)

( * ) Notice: Subject to any disclaimer, the term of this patent is extended or adjusted under 35 U.S.C. 154(b) by 105 days.

(21) Appl. No.: 18/437,805

(22) Filed: Feb. 9, 2024

(65) Prior Publication Data

US 2024/0187548 A1     Jun. 6, 2024

Related U.S. Application Data

(63) Continuation of application No. 17/359,397, filed on Jun. 25, 2021, now Pat. No. 11,917,327.

(51) Int. Cl.
| | |
|---|---|
| *H04N 7/01* | (2006.01) |
| *H04N 17/00* | (2006.01) |
| *H04N 21/2343* | (2011.01) |
| *H04N 21/845* | (2011.01) |

(52) U.S. Cl.
CPC .......... *H04N 7/0117* (2013.01); *H04N 17/00* (2013.01); *H04N 21/234363* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 9,854,020 B1* | 12/2017 | Kum ...................... | H04L 65/752 |
| 11,006,161 B1 | 5/2021 | Ducloux et al. | |
| 11,917,327 B2* | 2/2024 | Roeder .......... | H04N 21/234363 |
| 2007/0257988 A1* | 11/2007 | Ong .................... | H04N 19/154 |
| | | | 348/182 |
| 2010/0061446 A1* | 3/2010 | Hands .................. | H04N 19/177 |
| | | | 375/E7.126 |
| 2012/0147958 A1 | 6/2012 | Ronca et al. | |
| 2014/0189064 A1* | 7/2014 | Cilli ................. | H04N 21/44209 |
| | | | 709/219 |
| 2015/0026309 A1* | 1/2015 | Radcliffe ............. | H04L 47/125 |
| | | | 709/219 |
| 2016/0134881 A1 | 5/2016 | Wang et al. | |
| 2016/0173915 A1* | 6/2016 | McCarthy .......... | H04N 21/2393 |
| | | | 725/95 |
| 2016/0191961 A1 | 6/2016 | Fisher et al. | |
| 2016/0205407 A1* | 7/2016 | Carmel ................ | H04N 19/177 |
| | | | 375/240.01 |
| 2016/0353138 A1* | 12/2016 | Bennington ..... | H04N 21/23418 |

(Continued)

*Primary Examiner* — Alexander Q Huerta
(74) *Attorney, Agent, or Firm* — Bookoff McAndrews, PLLC

(57) ABSTRACT

A method for reducing artifacts in streaming video implemented by a computing device involves determining whether a video quality assessment score for a current segment of a channel of a video stream with a first resolution and a first bit rate meets a quality threshold, replacing the current segment with a replacement segment with a lower resolution than the first resolution, in response to the current segment failing to meet the quality threshold, and publishing the replacement segment at the first bit rate as part of the video stream.

20 Claims, 7 Drawing Sheets

(56)                    References Cited

U.S. PATENT DOCUMENTS

| | | | |
|---|---|---|---|
| 2017/0093648 A1 | 3/2017 | Elarabawy et al. | |
| 2020/0059654 A1* | 2/2020 | Kelly et al. | |
| 2020/0068000 A1* | 2/2020 | Dhanabalan | H04N 21/23439 |
| 2020/0314437 A1* | 10/2020 | Smole | G06N 20/00 |
| 2020/0322567 A1 | 10/2020 | Liu et al. | |
| 2021/0279222 A1 | 9/2021 | Peng | |
| 2022/0191562 A1* | 6/2022 | Mishra | G06V 10/40 |
| 2022/0201344 A1 | 6/2022 | Panje | |
| 2022/0264168 A1 | 8/2022 | Dahl et al. | |

* cited by examiner

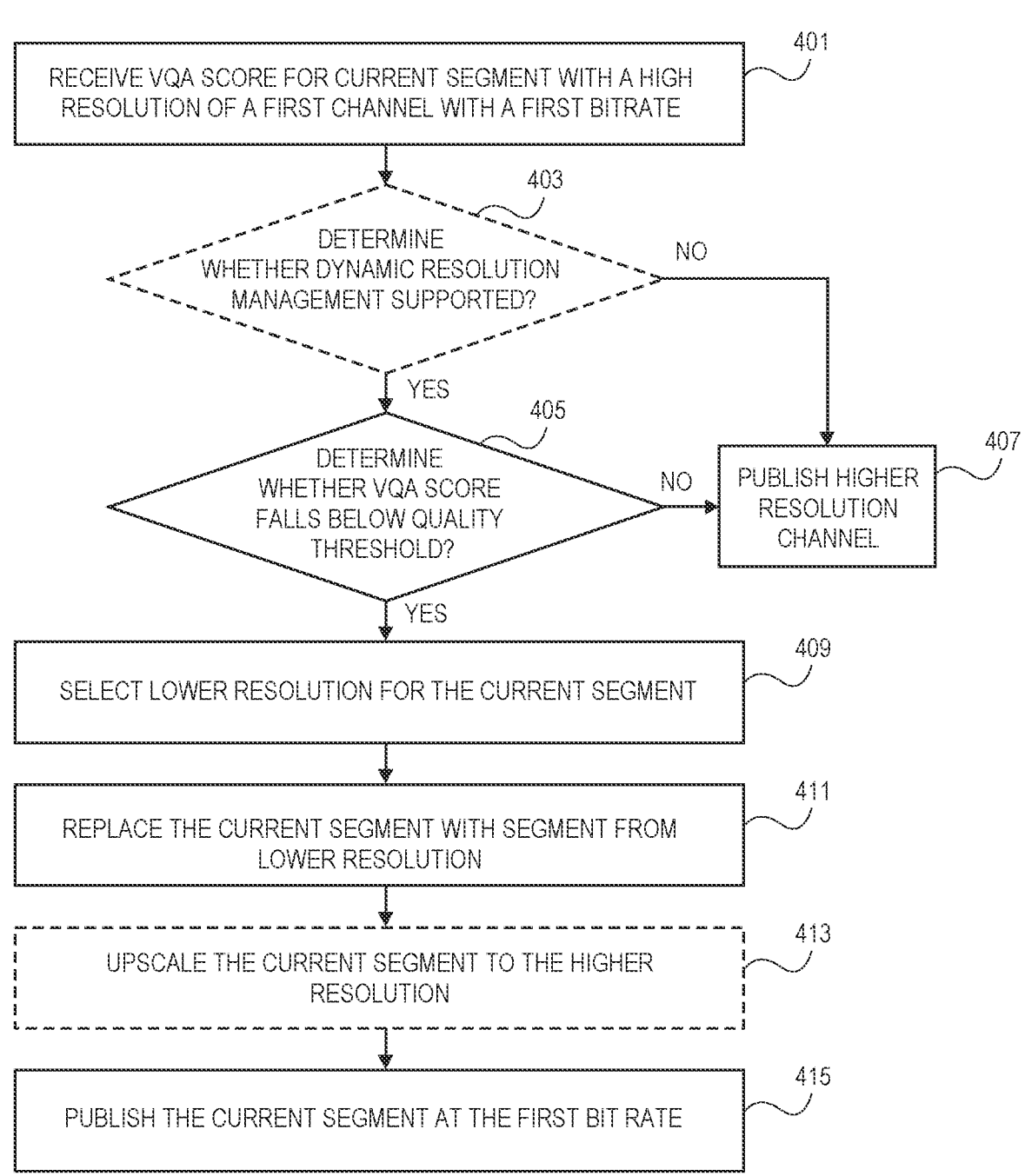

RECEIVE VQA SCORE FOR CURRENT SEGMENT WITH A HIGH RESOLUTION OF A FIRST CHANNEL WITH A FIRST BITRATE — 401

DETERMINE WHETHER DYNAMIC RESOLUTION MANAGEMENT SUPPORTED? — 403

NO

YES

DETERMINE WHETHER VQA SCORE FALLS BELOW QUALITY THRESHOLD? — 405

NO

PUBLISH HIGHER RESOLUTION CHANNEL — 407

YES

SELECT LOWER RESOLUTION FOR THE CURRENT SEGMENT — 409

REPLACE THE CURRENT SEGMENT WITH SEGMENT FROM LOWER RESOLUTION — 411

UPSCALE THE CURRENT SEGMENT TO THE HIGHER RESOLUTION — 413

PUBLISH THE CURRENT SEGMENT AT THE FIRST BIT RATE — 415

FIG. 4

DYNAMIC RESOLUTION SWITCHING IN LIVE STREAMS BASED ON VIDEO QUALITY ASSESSMENT

CROSS-REFERENCE TO RELATED APPLICATIONS

This patent application is a continuation of and claims the benefit of priority to U.S. Non-provisional application Ser. No. 17/359,397, filed on Jun. 25, 2021, the entirety of which is incorporated herein by reference in its entirety.

TECHNICAL FIELD

The embodiments of the invention are related to the field of managing video streaming quality. More specifically, the embodiments of the invention relate to methods and systems for assessing video quality and adjusting a resolution of the video on a segment by segment basis while maintaining a consistent bit rate.

BACKGROUND ART

Video formats, which can include accompanying audio, can vary and have a variety of characteristics related to the quality of the video and audio. When video and audio are transmitted or their format altered, the characteristics of the video and audio can be altered. This can affect the overall quality of the video and audio. As used herein, video quality can refer to characteristics of the video and audio as they are perceived and as compared to the originally captured video and audio (or a similar reference point).

Video processing systems can introduce distortion or artifacts in the video and audio that negatively impact perception of the video and audio by a user as well as the metrics of the characteristics of the video and audio. Measuring and preserving the quality of video and audio is an important aspect of many audio/video technologies.

Many devices, systems, and technologies related to audio/video perform video quality evaluation to measure the quality of an input audio/video source. These video quality evaluation processes can utilize objective mathematical models or subjective assessments (e.g., by user grading or assessment). Objective mathematical models of video quality can approximate results from subjective assessment. The term objective mathematical models can be statistical models in which several independent variables are fit against results obtained in a subjective assessment. The term "objective" mathematical models relate to models that are based on criteria that can be measured objectively, i.e., without subjective assessment. Objective mathematical models can be automatically evaluated by a computer program and deterministically output the same quality score for a given set of input parameters.

Video streaming quality can suffer in video segments with high motion, high detail, high contrast, scene cuts, color gradients, camera blur and other qualities. In these video segments, the video quality will visibly degrade for short periods because of excessive compression of the video stream. While video quality evaluation can detect these low quality video segments, for example, where compression artifacts were visible, the only way to solve this problem is to increase the bitrate or modify some of the encoding parameters. Increasing the bitrate is often not possible because bandwidth limitations can be fixed. Encoding parameters are established and tuned before the encoding starts and are not designed for alteration during the streaming of a video channel on a per video segment basis.

BRIEF DESCRIPTION OF THE DRAWINGS

The invention may best be understood by referring to the following description and accompanying drawings that are used to illustrate embodiments of the invention. In the drawings:

FIG. 4 is a flowchart of one embodiment of a process for dynamic resolution switching by a dynamic resolution manager.

DETAILED DESCRIPTION

Figure 1A:
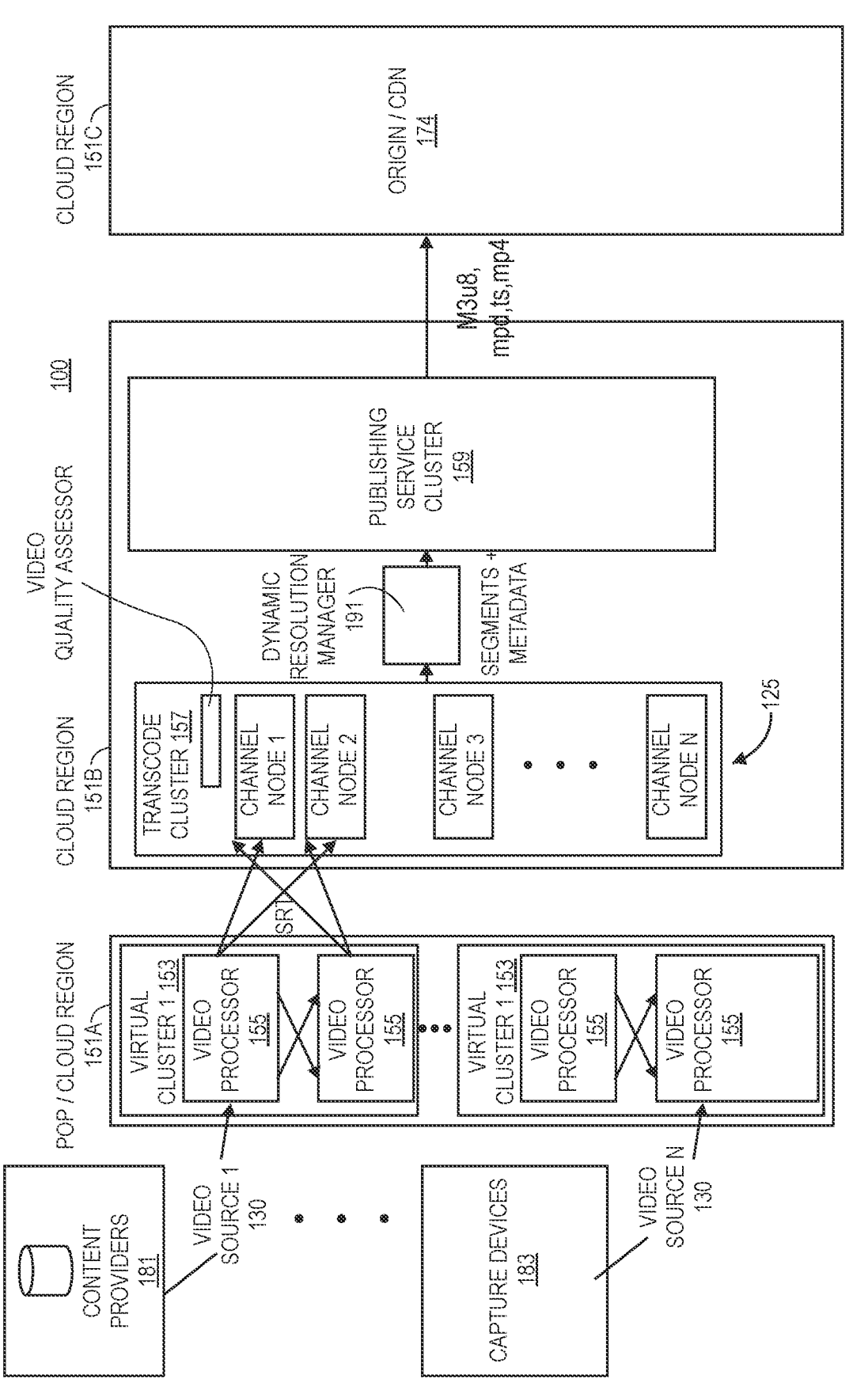
FIG. 1A is a diagram of one embodiment of a video streaming system supporting dynamic resolution switching.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

Video Streaming System in a Cloud Computing Environment

FIG. 1A is a first embodiment of a video streaming system to support dynamic resolution switching in a cloud computing environment. The cloud computing environment can include a set of cloud regions 151A-C. A 'set,' as used herein can refer to any whole number of items including one item. These cloud regions can be different cloud computing environments provided by a same or different cloud computing provider. The cloud regions 151A-C can have different geographic locations and electronic device components and resources that are interconnected via communication networks with the other cloud regions 151A-C. Any number, configuration, and variety of cloud computing environments and regions 151A-C can be utilized to provide the video streaming system 100. In some embodiments, some of the components of the video streaming system 100 are located in a set of electronic devices referred to as a point of presence (POP). The POP 151A can be provided by an internet service provider or similar interface through which external resources and electronic devices can interact with the cloud computing environment.

In an example embodiment, the video streaming system 100 includes a set of virtual clusters 153, a transcode cluster 157, and a publishing service cluster 159. Each cluster can be composed of any number and combination of electronic devices including servers, storage devices, networking devices and related devices that make up a cloud computing environment. The virtual clusters 153 can support a set of video processors 155. These video processors 155 can execute software components that process the incoming video sources 130 and are hosted by the virtual clusters 153.

The video processors 155 can perform tasks associated with each video source 130 to process that video source and can be considered a unit of work or a worker in the video streaming system 100. Each video processor 155 can perform a single task or multiple tasks and can operate in conjunction with other video processors 155 to process the video sources 130. Any number of virtual clusters 153 can manage any number of video processors 155, which together can process any number of video sources 130.

Video sources 130 can be any type of video input in any format that is provided by any source device or set of devices. For example, video sources 130 can be provided by a set of content providers 181, which are sets of devices operated by an entity that produces a video source 130 to be processed by the video streaming system 100. In some cases, the video sources 130 can be provided directly or indirectly by a set of capture devices 183 such as live programming (e.g., sporting events). Any content provider 181, capture device 183, or similar set of devices providing the video sources 130 can execute or be in communication with the virtual clusters 153 for video stream processing.

The output of the video processors 155 can be provided to a transcode cluster 157. The transcode cluster 157 can further process the video sources to organize the video sources into a set of channels handled by associated channel nodes 125. The transcode cluster 157 and channel nodes 125 can combine video sources from the video processors 155 and encode the resulting video streams according to the configuration of the respective channels to be distributed to the publishing service cluster 159. A transcode cluster 157 is a set of electronic device resources including servers, storage devices, and networking devices that support any number of channel nodes 125. Similarly, the publishing service cluster is a set of electronic device resources including servers, storage devices, and networking devices that support any number of video streams that are to be published to a content distribution network 174 or in some cases returned to an origin server (e.g., a video source provider or other entity that may publish the video stream). In some embodiments, the transcode cluster 157 can output the video streams as segments and associated metadata. In some embodiments, the publishing service can format the video streams using video encoding formats M3u8, MPD, TS, MP4 and similar video encoding formats. As used herein video, audio/video, and similar terms are used interchangeably to include video formats that may also encompass audio aspects.

A video quality assessor 190, generates a video quality assessment or score. This video quality assessor 190 process can be implemented at any number of points within the video streaming system 100 such that video quality can be assessed at each stage and compared across stages to identify changes in video quality. In the embodiments, the video quality assessor 190 generates a score assessing the quality of each of the video channel nodes 125 being handled by the transcode cluster 157. The video quality assessor scoring can be on any scale and have any granularity. The video quality assessor scoring can be done on a per frame, per segment, or at similar intervals or timing. In the example embodiments herein, the video quality assessor scoring is on a per segment basis. A video segment can be a group of frames of any size or number. In some embodiments, the video segment is a group of pictures (GOP) data structure which is a group of successive images encoded withing a video stream. Thus, a video channel can be a successive set of GOPs. A GOP can be a data structure can start with an I frame (keyframe) and include any one or more additional frames that are predictive coded (P) picture frames, bipredictive coded (B) picture frames, direct coded (DC) picture frames, or similar frame types. The GOP structure can include other metadata related to the number and type of frames included. The GOP structure can be implemented with various encoding standards such as H.264, H.265, and similar encoding standards. Where the video quality assessment is performed for a segment, the segment can be a GOP or similar set of images.

The dynamic resolution manager 191, as describe further in relation to FIG. 3 determines whether the quality of the segments of each video channel meet a threshold level. For example, where the video quality assessment is on a scale of 0 to 100, the dynamic resolution manager 191 can assess that the segments with a score below a threshold of 60 have a low or insufficiently quality. The threshold level can be set by administrators, by artificial intelligence feedback, deterministic mechanisms, or similar automated processes. Where the segment fails to meet the pre-defined threshold, the dynamic resolution manager 191 can encode the segment at a lower resolution where the lower resolution segment is less compressed and has fewer artifacts. This can provide a tradeoff where the lower resolution with fewer artifacts caused by compression is a better viewer experience than a higher resolution video segment with more artifacts. Thy dynamic resolution manager 191 can manage the overall bitrate of the video stream being adjusted. The bitrate of the video stream can have a limitation that causes the compression that creates the artifacts. The selection of the lower resolution can be such that the overall bit rate limitation is not exceeded. In some embodiments, the dynamic resolution manager 191 can upscale or similarly modify the resolution of the video segment after a switch to the lower resolution encoding to ensure a consistent resolution where required for end players. The operation of the dynamic resolution manager 191 is describe further herein in relation to FIGS. 3 and 4.

Figure 1B:
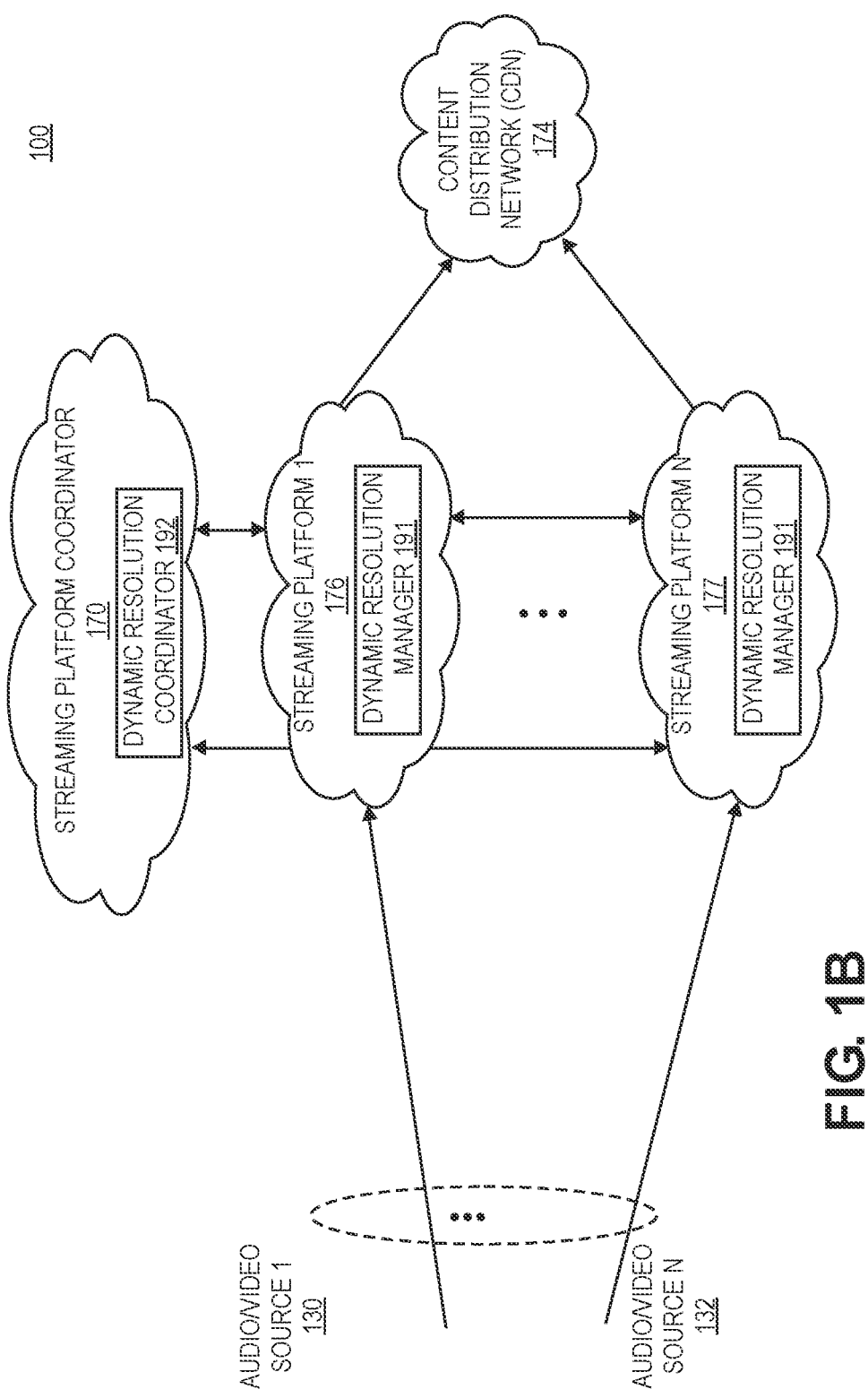
FIG. 1B is a diagram of another embodiment of a video streaming system containing multiple video streaming platforms.

FIG. 1B illustrates another embodiment of a video streaming system containing multiple video streaming platforms. A video streaming system 100 includes multiple video streaming platforms represented by a streaming platform 1 through a streaming platform N at references 176 and 177, a content distribution network 174, and a streaming platform coordinator 170.

The streaming platform coordinator 170 communicates with all the video streaming platforms including the streaming platforms 1 through N. The streaming platform coordinator 170 coordinates processing of the media contents routed to the various video streaming platforms. The processed media contents from the video sources are then published to the content distribution network 174.

It is to be noted that the various video streaming platforms and/or the streaming platform coordinator may be hosted by any one or more of various cloud computing providers. When two video streaming platforms are hosted by two different cloud computing providers, which generally offer computing resources with different characteristics, the two video streaming platforms are often referred to as heterogeneous video streaming platforms (versus homogenous video streaming platforms hosted by the same cloud computing providers). Cloud computing providers are building up their infrastructures at various geographic locations, and it is now practical for the video streaming system to utilize the cloud infrastructures concurrently at the various geographic locations and/or by different cloud computing providers.

Each video streaming platform may contain any number of video quality assessment processes and dynamic resolution switching processes, which are illustrated as a set of dynamic resolution managers 191 in streaming platforms 1-N, respectively. The dynamic resolution managers 191 are to process a video quality score or assessment for input video sources 130-132, caused by processing media workflows created for video sources in a video streaming platform as discussed in more details herein below, or in similar processing of the received media (i.e., video) as it is received from the video sources, handled by the streaming platforms, and forwarded via the content distribution network 174, and determine whether dynamic resolution switching can be employed to improve the quality of the video stream.

In some embodiments, the streaming platform coordinator 170 may contain a video quality assessor that similarly generates video quality assessments, that manages the video quality assessors across the streaming platforms, or that collects video quality scores or similar metrics from the video quality assessors from the processing of media workflows in all video streaming platforms the streaming platform coordinator 170 interacts with, and the streaming platform coordinator 170 may manage or coordinate notifying the dynamic resolution managers 191 at the respective streaming platforms to address any issues in video quality. A dynamic resolution coordinator 192 can coordinate resources related to the video quality assessors and dynamic resolution managers 191 at different video streaming platforms. Where a feedback mechanism is available in the system 100 the dynamic resolution coordinator 192, dynamic resolution managers 191 or video quality assessors can send notification of changes in video quality to the feedback mechanism that may report the changes to a video source or administrator. In cases where corrective components are available in the system 100, the reporting of the changes in video quality can trigger further processing to correct or ameliorate the video quality issues. The reporting of the video quality changes can specify the video quality scores, metrics related to the video quality changes such as changes in the resolution for the video source as well as other relevant information utilized in correcting or monitoring the video quality in the system 100.

Video Streaming Platform in a Cloud Computing Environment

A set of video streaming platforms is a main component of a video streaming system 100 as illustrated in FIG. 1B. The video streaming platforms 176 and the video streaming system 100 can perform any number of operations to process any number of input video sources 130-132 and output via a content distribution network 174 to reach any number of consuming devices and software applications. The operations performed on the video sources 130-132 can include the video quality assessment and dynamic resolution switching processes described herein implemented by video quality assessors 190 and dynamic resolution managers 191, as well as other similar components. Each streaming platform 176 can execute any number of video quality assessors 190 and dynamic resolution managers 191 using workers or similar mechanisms as described further herein. The video quality assessors 190 and dynamic resolution manager 191 can operate on a per streaming platform 176, per video source 130-132 or similar basis.

Figure 2:
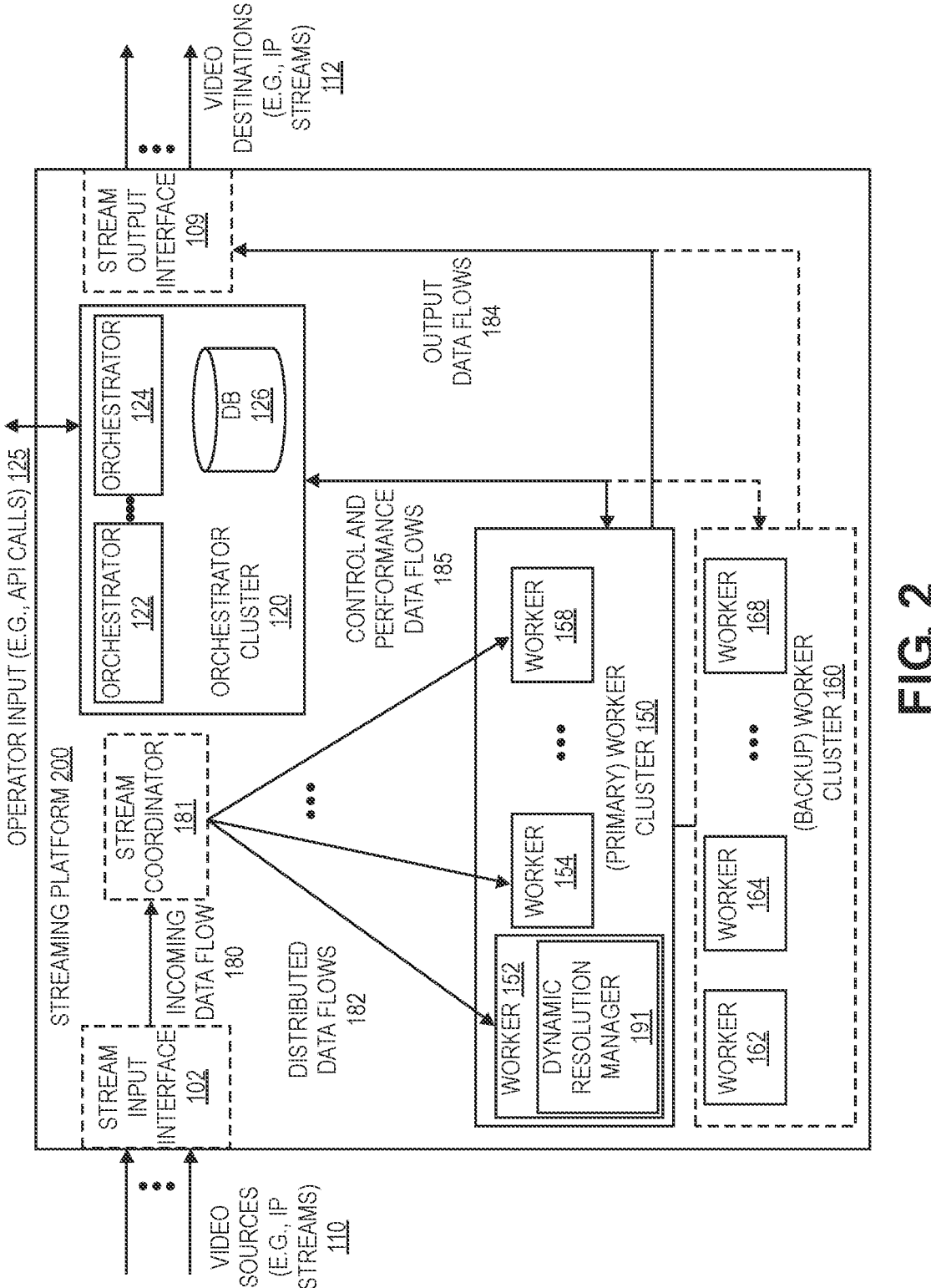
FIG. 2 is a diagram of one embodiment of one of the video streaming platforms in the video streaming system.

The architecture of the video streaming platform and its operations are discussed in more detailed discussion with relation to the additional figures. FIG. 2 illustrates a video streaming platform in a cloud computing environment according to one embodiment of the invention. A streaming platform 200 (also referred to as a video streaming platform, and the two terms are used interchangeably in the specification) is a computing system, and it contains one or more machines including one or more server computers, gateways, routers, or other computing/networking electronic devices. A streaming platform coordinator (such as the streaming platform coordinator 170) manages operations of the streaming platform 200, yet some or all of the electronic devices within the streaming platform 200 may be owned by a third party such as a cloud computing provider discussed herein above. That is, a cloud computing environment operated by a cloud computing provider may host the streaming platform 200.

The streaming platform 200 receives its data flow input at a stream input interface 102 in one embodiment. For example, video sources to be processed by the streaming platform 200 enters through the stream input interface 102. A video source contains one or more Internet Packet (IP) packet streams in one embodiment. The IP packet streams may contain one or more live video feeds. A live video feed may be video of a live event or live performance. The live video can also be video of a prerecorded event being played back according to a schedule. The live video feed may be a video broadcasted over cable, satellite, or over-the-air. It is to be noted that the terms "video source," "video stream," and "video feed," as used interchangeably herein, refer to the video and corresponding audio of the particular recorded event (e.g., TV show, live performance, sporting event, etc.), but also may include video only. Additionally, the video source (sometimes referred to as the video and audio streams) of the streaming platform 200 may contain only audio (e.g., an Internet radio stream). The video source may be a webcast of a television broadcast, such as of a sporting event, a live or recorded performance, a live or recorded news report, or the like. A live event may also have prerecorded content intermingled with live media content, such as advertisements, which are played in between the live telecast. It should be noted that the embodiments of the invention described herein may also be used for streaming video-on-demand (VOD) and any other type or combination of pre-recorded audio/video content.

A video source may be "pushed" to the streaming platform 200 where the video source is IP packet streams such as the Moving Picture Experts Group (MPEG)—transport streams (MPEG-TS). The IP packet streams logically flow to streaming platform 200 from an external source thus the video source is referred to as being pushed to the streaming platform 200.

A video source may also be "pulled" by a processing unit (referred to as a worker) of streaming platform 200, where the worker runs one or more processing tasks. The worker may initiate a Transmission Control Protocol (TCP) connection to an external uniform resource identifier (URI) (an external uniform resource locator (URL) or an external uniform resource name (URN)), and after performing a protocol handshake, cause inbound IP packet streams to flow directly into the worker for one or more processing tasks without being processed by the optional stream input interface 102 or the stream coordinator 181. The pull of video feeds may be implemented through the real time messaging protocol (RTMP), where the processing task includes a RTMP capture task.

The stream input interface 102 is a logical input point for data flows into the streaming platform 200. It may not be present as a physical entity of the streaming platform 200 in one embodiment. From the stream input interface 102, a video source becomes an incoming data flow 180. The incoming data flow contains data of one or more video and audio streams. In one embodiment, the incoming data flow is transmitted in user datagram protocol (UDP) packets. The incoming data flow 180 may optionally go to a stream coordinator 181, which converts unicast data flows into distributed data flows 182.

Workers may be organized as worker clusters in a streaming platform. In the streaming platform 200, workers 152-158 are in a primary worker cluster 150, which contains workers actively working on processing tasks. Workers 162-168 are in a backup worker cluster 160, which contains workers remains standby thus provides redundancy and robustness for the streaming platform 200. Workers perform tasks through coordination with one or more orchestrators, which may form an orchestrator cluster such as an orchestrator cluster 120. The orchestrator cluster 120 interacts with worker clusters 150-160 through one or more control flows, included in control and performance data flows 185.

The orchestrator cluster 120 contains orchestrators 122-124 and an orchestrator database 126 that stores data for operations of the orchestrators. The orchestrators may form load-balanced group within an orchestrator cluster, and the orchestrator cluster may be paired with another separately located orchestrator cluster (e.g., the other orchestrator cluster being at a different rack or even a different geographic location) for redundancy and robustness purpose too. An orchestrator creates a workflow for a video source in the streaming platform 200, and it may also host services responsible for work scheduling and overall system health monitoring and management. In some embodiments, the orchestrator database 126 is optional. For example, each of the orchestrators 122-124 contain a distributed in-memory storage to store information for the operations by the orchestrator 122-124 and/or orchestrator cluster 120. In the alternative, a database outside of the orchestrator cluster 120 may store the information for the operations by the orchestrator 122-124 and/or orchestrator cluster 120 (e.g., the database may be stored in a streaming platform coordinator such as the streaming platform coordinator 170 in FIG. 1).

Workers are coupled to one or more orchestrators, and the workers execute processing tasks on the distributed data flows 182. The data flows are processed, and the workers produce output data flows 184. The output data flows 184 may optionally transmit to a stream output interface 109, a logical output point for the data flows going out of the streaming platform 200. It is to be noted that both the stream input interface 102 and the stream output interface 109 may be integrated into parts of worker functions and they may not be individual physical units of the streaming platform 200.

Output data flows goes to video destinations 112, which contains one or more IP streams in one embodiment. The output data flows may be delivered to an ingest point of a content delivery network (CDN). A CDN is a system of computers networked together across the Internet that cooperates transparently to deliver content, and may include, for example, one or more origin content servers, web servers, cache servers, edge servers, etc. The output data flows may also be delivered to a video playback device directly. A single output data flow may be delivered to multiple destinations through multicast.

It is to be noted that both workers and orchestrators of the streaming platform may be implemented on cloud-hosted virtual machines (VMs). The VMs are parts of the cloud computing environment hosting the streaming platform and they reside on computing systems of the cloud computing environment. These computing systems are referred to as hosts of the workers and orchestrators in the streaming platform 200. The hosts are managed by a cloud provider, and they may concurrently host applications other than the video streaming platform. Thus, the worker hosts are not dedicated to the streaming platform, and they are allocated to the streaming platform as needed and according to coordination of the orchestrators.

It is to be noted that in some embodiments orchestrator cluster 120 also contains a dynamic resolution coordinator 192, dynamic resolution managers 191, and/or video quality assessors 190. The dynamic resolution coordinator 192 monitors the dynamic resolution managers 191 in the streaming platform 200 through collecting performance data from the workers (e.g., the performance data collected along with the control flows, as the control and performance data flows illustrated at reference 185) and determines if any resources need to be reconfigured for the dynamic resolution manager 191. When changes in video quality are detected, the dynamic resolution manager 191 can initiate mitigation and/or provide notification (e.g., to an operator of the streaming platform 200 and/or to a streaming platform coordinator). While the dynamic resolution manager 191 is illustrated as a standalone entity of the orchestrator cluster 120, the video quality manager 191 may be integrated with other entities such as orchestrators 122-124. Additionally, a portion of the dynamic resolution manager 191 may be within the orchestrator database 126 in one embodiment.

For the streaming platform 200, a graph of tasks is used to process a media workflow. A media workflow, also referred to as a workflow or channel (the terms workflow and channel are used interchangeably in the specification), represents a processing work flow that transforms an individual incoming data stream (e.g., a video source) into its configured output data stream(s), and it contains all of the necessary information used to create a directed task graph and to calculate the correct parameters for each task required in order to correctly transform the incoming data stream into the specified output data stream(s). During workflow creation, the orchestrator is responsible for compiling a channel definition (e.g., using the JavaScript Objection Notation (JSON) format) into a directed graph of tasks (referred to as a task graph) with associated configuration data and for assigning those tasks into logical groups (referred to as task groups) based on estimated resource requirements. The directed graph of tasks is a directed acyclic graph (DAG) of tasks for processing the video source. A DAG is a directed graph with no directed cycles. The directed graph is formed by a collection of nodes (also referred to as vertices) and directed edges, each edge connecting one node to another, such that there is no way to start at a node and follow a sequence of edges that eventually loops back to the node. Each node of the task graph represents a processing task, and each edge represents a data flow across two processing tasks and corresponding input and output of each processing task.

Overall, the streaming platform 200 ingests video sources, transcodes, and transforms the video sources into desired one or more formats for publication and then outputs the resulting video data. The video streaming platform is a distributed architecture using cloud resources, and it is a flexible, scalable, and efficient platform for video processing. The streaming platform 200 receives operator input 125 to the orchestrator cluster 120. The operational input may be from the streaming platform coordinator 170. The communication between the streaming platform coordinator 170 and the streaming platform 200 may include sending requests/confirmations from the streaming platform coordinator and updates/responds from the streaming platform 200. The operator input 125 may receive input also from an operator separately from the streaming platform coordinator 170. The operator input may be in the form of API calls. One of the requests from the streaming platform coordinator is a request to create a workflow for a video source in the streaming platform 200. The request (may be referred to as a channel creation request) may contain a variety of parameters describing the video source and the expected operations. For example, the request may contain at least one of the following:

Mandatory parameters describing the type of the video source (e.g., MPEG-2, MPEG-4, H.265, and etc.), and location of the video source (e.g., ingest protocol, IP address, URI, and etc.).

Indication of whether and how to enable subtitle processing and/or enable advertisement insertion processing for the video source.

The desired video and audio transcoding operations (e.g., how many audio/video layers, the desired output characteristics for each such as video frame size/rate and bitrate, the relevant portion of the incoming data flow to use if applicable) for the video source.

The desired contention protection operations for the published output (e.g., Microsoft® PlayReady, Adobe® Access DRM, AES-128 Encryption for HTTP live streaming, etc.).

The desired publishing operations to output (e.g., which output format(s) such as HTTP live streaming (HLS), HTTP dynamic streaming (HDS), RTMP, or Microsoft® smooth streaming) to publish, and the destination(s) to send each output format.

Based on the request, the orchestrator cluster 120 creates media workflows for video sources 110, utilizing directed graphs of tasks, and each of the so called task graphs is a directed acyclic graph (DAG) of tasks for processing the video source. Each task graph contains tasks to be performed by a worker of the streaming platform 200. The tasks are then assigned to workers for execution, and the results are included in the output data flows 184.

A media workflow contains a large number of tasks to be performed by a video streaming platform. An outside-in network management approach (e.g., SNMP), where the network management system can only collect performance data at a worker level, cannot provide efficient performance monitoring of the processing of the media workflow within the video streaming platform, let alone video quality assessment and dynamic resolution switching with regard to the processing blocks in a timely fashion. For example, the worker is often implemented as a virtual machine in the video streaming platform, and using SNMP, an operator of the video streaming platform may determine a percentage of central processing unit (CPU) usage. The CPU usage may be too high (90%) for the worker, but without knowing the details of the processing of the media workflow, SNMP cannot determine the reason of the high CPU (e.g., it can be caused by malfunctioning of decoder, frame rate conversion, scaling, and/or video encoders), thus cannot provide effective mitigation.

Operations of Video Quality Assessment in a Video Streaming Platform

The embodiments utilize a video quality assessment process which can be based on a full-reference or semi-referenced models, which are based on natural scene statistics or manually tagged mean opinion score (MOS) scoring systems. In other embodiments, the video quality assessment does not rely on full-reference or semi-referenced models. Video quality assessment such as video multimethod assessment fusion (VMAF), peak signal to noise ratio (PSNR), and structural similarity index measure (SSIM) are metrics used for video quality assessment. However, for live videos stream which have captions, scene cuts, advertisements, and similar components, the aforementioned metrics do not produce effective video quality assessment and are computationally intensive. The embodiments can utilize a machine learning algorithm and architecture for video quality assessment that uses compression parameters with auto-tagged continuous values to assess video quality in real time or similar techniques.

Video quality assessment algorithms can be full reference or semi-referenced models that are trained on white-labeled videos (i.e., video sources that do not have markings such as logos and similar content). These algorithms are based on natural scene statistics, signal-to-error ratios, or structural similarity. However, these video quality assessment process do not provide accurate assessment for videos that have captions, advertisements, logos, or other text or graphics. These processes also need a source reference to train to predict quality. In live video streams natural scene statistics based metrics do not produce effective quality measurements within acceptable latency requirements.

The embodiments can utilize video quality assessments that do not rely on reference images by using compression parameters that represent temporal and spatial compression artifacts (e.g., quantization parameter, motion vectors, bitrate, scene cuts, and derived parameters) with auto-tagged continuous variables to train machine learning models that can assess video quality in real-time. The embodiments extract the aforementioned parameters from received or input frames (e.g., any subset of the received frame including in some embodiments each received frame) and derives normalized statistical features for the inspected frames. The input videos are auto-tagged using transfer learning and machine learning models that are trained on the statistical features as input with the continuous values from the tagging process as the output. Distributed machine learning pipelines are used to extract statistical features from live video streams and a trained model is used to assess the video quality in real-time. The embodiments use transfer learning to train a machine learning model that can assess content in each video frame based on compression parameters and predict the quality of the content by providing a score over a defined range (e.g., between 0-100). This can be done in real time and scaled in the cloud for multiple live streams. The embodiments provide an advantage by automatically enabling assessment of video quality in real time for video sources as they travers the streaming platform. Being able to generate accurate video quality assessments for video sources in real-time enables smarter live stream and live-to-VOD processing based on the video quality including dynamic resolution switching.

Figure 3A:
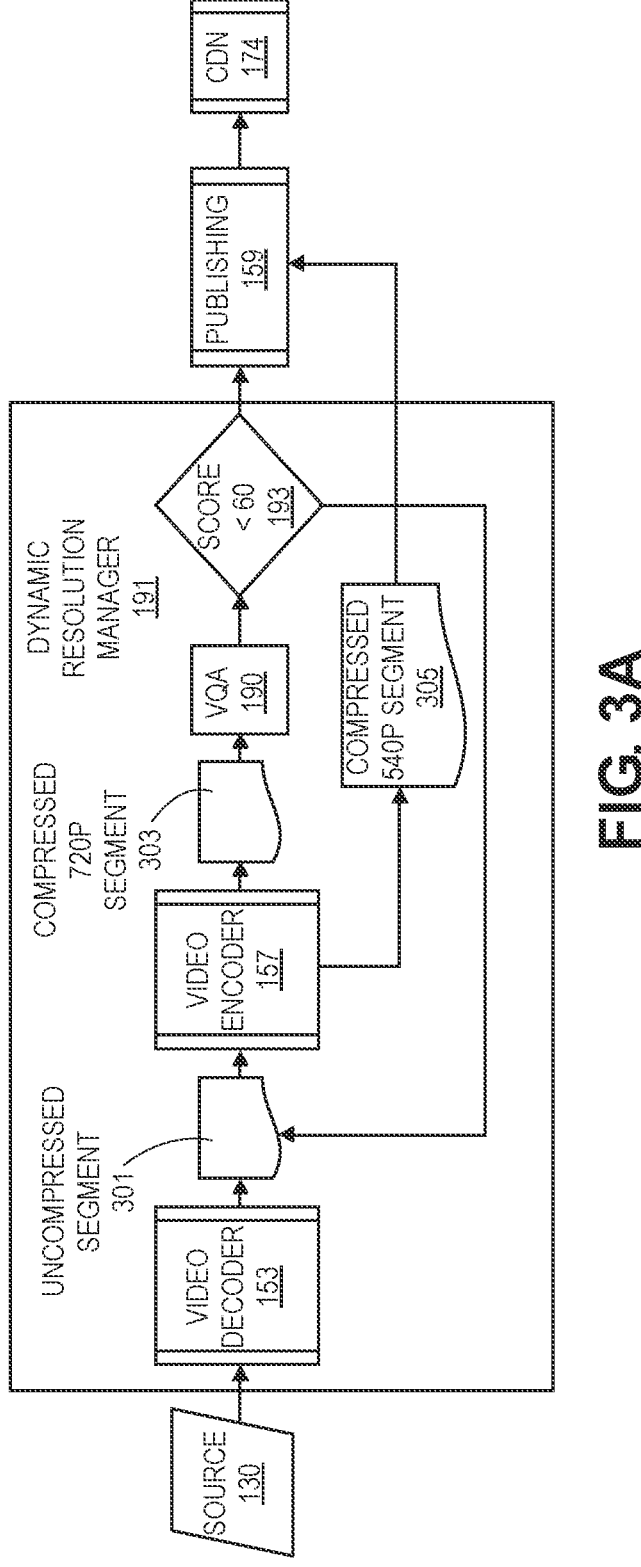
FIG. 3A is a flowchart of one embodiment of a process for a serial dynamic resolution switching by the video streaming system.

FIG. 3A is a diagram of one embodiment of the components of the dynamic resolution switching process. The process of dynamic resolution switching is illustrated as an example that is end to end. A video source 130 provide a video stream that is to be processed by the video streaming platform, in particular an initial set of video processing is performed by the virtual cluster video decoder 153 or similar resource that prepares an uncompressed video stream for distribution. The video decoder 153 decodes the incoming source 130 to generate a stream of uncompressed segments 301. The uncompressed video stream 301 in the form of segments is then provided to the next stage of video processing where the video encoders of the transcode cluster 157 can encode the video stream at various resolutions within a defined bitrate limit for the video stream. In the illustrated example, the video stream is encoded as a set of compressed 720p segments 303. While compressed 720p segments are illustrated, one skilled in the art would appreciate that the other initial resolutions including 1080p, 4k resolutions, and similar resolution levels can be generated for the video stream. In the illustrated embodiment, a serial processing of the compressed 720p segment before the processing of a compressed 540p segment is shown.

Figure 3B:
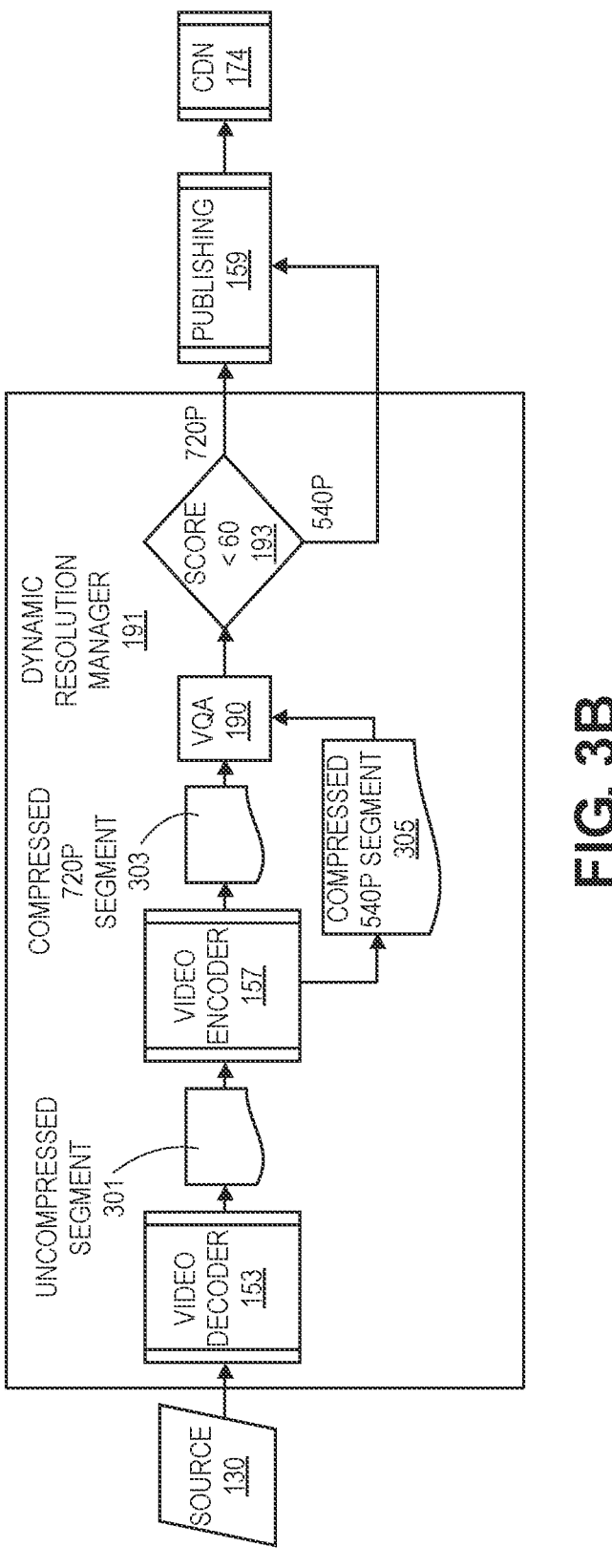
FIG. 3B is a flowchart of one embodiment of a process for parallel dynamic resolution switching by the video streaming system.

FIG. 3B is a diagram of another embodiment of the components of the dynamic switching process. In this embodiment, additional encodings at lower resolution levels 305, in this example a compressed 540p encoding, are generated in parallel to the higher resolution encodings 303 for each segment. In serial embodiment shown in FIG. 3A, the lower resolution encodings 305 are generated after a determination that the initial higher resolution encoding 303 does not have sufficient quality (i.e., does not meet the quality threshold).

Encoding the segments at multiple resolutions in parallel (as shown in FIG. 3B) requires greater compute resources. Encoding the segments at the lower resolutions on request (i.e., serially as shown in FIG. 3A) causes additional latency. In some embodiments, the dynamic resolution manager 191 can configure the use of parallel or serial segment encodings based on available compute resources or latency tolerance for the video stream.

In either embodiment, the higher resolution encoding 303 is processed by the video quality assessor (VQA) on a segment by segment basis and generates a score (e.g., on a scale of 0-100), which is provided to the threshold quality check 193 of the dynamic resolution manager 191. If the higher resolution encoding 303 and lower resolution encodings 305 are generated in parallel (as shown in FIG. 3B), the VQA 190 can assess the segment in both resolutions to determine which has a higher VQA score. In cases where the segment is encoded in the higher resolution first (as shown in FIG. 3A), then the VQA 190 can assess the score of the segment and the dynamic resolution manager 191 can determine whether the VQA score meets or exceeds a pre-defined threshold (e.g., >60 VQA score). If the higher resolution segment 303 meets or exceeds the pre-defined threshold, then the video segment can be published 159 and distributed via the CDN 174. If the higher resolution segment 303 does not meet or exceed the pre-defined quality threshold, then the dynamic resolution manager 191 can request that the transcode cluster 157 encode the video segment in a lower resolution 305. The lower resolution encoding 305 of the segment can then be published 159 and distributed 174. In some embodiments, the lower resolution encoding 305 can also be processed by the VQA 190 to determine whether it has a VQA score that meets or exceeds the threshold (e.g., 60). If the lower resolution encoding 305 does not meet the pre-defined quality threshold, then a further lower resolution encoding can be generated. The lowering of the resolution from the initial higher resolution can be by any interval or granularity that is supported by the video streaming system and the available encoders.

In some embodiments, the dynamic resolution manager 191 can request further video processing of a lower resolution video segment to upscale the resolution to the original or former resolution to ensure proper handling downstream of the dynamic resolution manager 191 such as at the video player. In this case, the use of the lower resolution video segment 305 reduces the degree, size, or number of artifacts, while the upscaling ensures proper downstream handling where dynamic resolution switching may not be supported. In some embodiments, the dynamic resolution manager 191 can upscale all segments where a lower resolution encoding has been selected. In other embodiments, the dynamic resolution manager 191 can request upscaling where there is a downstream compatibility issue with the lower resolution encoding.

FIG. 4 is a flowchart of one embodiment of a process for the operation of the dynamic resolution manager. The process is illustrated at a high level to represent the overall function of the dynamic resolution manager 191 in a video streaming system 100. The video streaming system receives media (e.g., a video source or stream) from a content producer or similar video source and manages the processing of that video source into a video channel. A sequential processing of the video stream is illustrated by way of example for clarity and conciseness. A "frame" of the video stream, as used herein, is an image composed of a matrix of pixels in time series with other frames to form the video. The frames can be grouped into segments. The media received from content producers can be encoded in any format and can have any size or organization. In some cases, the media can be formatted to satisfy legal agreements between content producers and content distributors who stream the media on their platform (e.g., via a content delivery network (CDN)) and/or to meet the technical requirements of the distributors who stream the media on their platform. The input video stream can be processed to determine video quality at any rate or interval. In some embodiments, each frame is analyzed for determination of a video quality score, while in other embodiments, groupings of frames (i.e., segments) are selected for assessment at defined intervals.

The video quality assessor can determine (e.g., extract or measure) a set of values of a set of features of the selected set of frames or current segment for input into a machine learning model, algorithm, or similar assessment mechanism. Any type of machine learning model can be utilized. In some embodiments, a deep discriminative, generative neural network, or similar machine learning model can be utilized. The machine learning model is provided the set of features as input. Any set of features can be selected for input to the machine learning model. Features that are selected and identified in the input frames can include quantization parameters, motion vectors, bitrate, scene cuts, derived parameters, video quality scores from preceding or related frames in the video source, and similar features. These features are selected for real time computation or extraction from the input video frames and can be derived without significant computational latency such that they can be input into the machine learning model without significant delay to the handling of the video source.

Once the set of features are determined for the set of input frames, then they can be applied as input to the machine learning model to generate a video quality assessment score. In some embodiments, the machine learning model can also generate a confidence score for the video quality score. The confidence score can have a defined range (e.g., 0 to 100) that indicates the probability of the accuracy of the video quality assessment score. The dynamic resolution manager 191 can receive the video quality assessment score for a current segment that has been encoded with a higher resolution for a video channel where the video channel has a defined bitrate or bitrate limit (Block 401). In some embodiments, the video quality assessment score is received for just the high resolution encoding of the segment. In other embodiments, video quality assessment scores can be received for any number of different encodings of the current video segment.

In some embodiments a check can be made whether the downstream devices and network support dynamic resolution switching (Block 403). In these embodiments, the dynamic resolution manager is able to poll downstream devices for support or the support of downstream devices is reported to the dynamic resolution manager. If downstream devices do not support the dynamic resolution switching process, then the higher resolution encoding of the current segment can be published for the video channel. If the check is not performed or where the downstream components do support the dynamic resolution management, then the dynamic resolution manager can proceed to determine whether the received video quality assessment score meets a pre-determined quality threshold (Block 405). The pre-determined quality threshold can be determined by an administrator, a feedback mechanism (e.g., an artificial intelligence model), algorithm, or similar mechanism. If the video quality assessment score meets the quality threshold, then the segment at the higher resolution encoding can be published to the video stream channel (Block 407). A lower resolution encoding can be selected based on a fixed set of options (e.g., a single alternative to the higher resolution encoding) using any criteria or process (Block 409). If there is a single alternative, then the alternative is requested or selected where the alternative has been encoded in parallel. In some embodiments, the video quality assessment score and/or the confidence of that score can be utilized in selecting a lower resolution for encoding. Where the video quality score or confidence are low (e.g., from 0 to 20), then a lowest available encoding can be selected. Better video quality scores (e.g., from 40 to 60) or confidences can be utilized to indicate that an available resolution encoding closer or closest to the original encoding resolution can be utilized.

Once the lower resolution encoding has been generated, then the current segment of the video stream can be replaced with the lower resolution encoding in the video stream of the video channel (Block 411). The re-encoding of the segment can cause some latency in the video stream, however, generally this is within an overall delay of the video stream from the source such that the re-encoding does not significantly alter the overall video stream experience for the end user. The dynamic resolution manager 191 can track the sequence of segments and ensure that the re-encoded segments are placed in the video stream at the same location as the original segment. In some embodiments, the re-encoded segment can be further processed by upscaling the segment to the original resolution (Block 413) such that any downstream devices that would not work with the lower resolution segment do not have compatibility issues. Upscaling may be used as an alternative to other measures to ensure downstream support for dynamic resolution switching. Once any further video processing (e.g., the upscaling) is complete, then the re-encoded resolution can be published at the same bitrate or within the limitations of the bitrate for the video streaming channel (Block 415). In this manner the bitrate of the video channel can be maintained or limited while improving the video quality assessment and user experience.

A check is made after the processing of each segment to determine if there are more frames to process for the video source. As long as the video source is continuing to stream to the destination, then the processing of the video stream segment by segment can continue with dynamic adjustment of the resolution of each segment as needed. If the video stream completes, then the process can end the video quality assessment and dynamic resolution switching for the video stream of the video channel.

In further embodiments, the received video stream is broken down into individual frames or other sub-divisions other than segments based on GOPs and processed sequentially, in parallel, batches or similarly processed. In some cases, a pre-processing of the segment or frames are performed to enhance the image for video quality assessment. In some implementations, the frames or segments are pre-processed by adjusting (e.g., increasing) image brightness, adjusting contrast, by converting the frame to greyscale, and/or similarly altered to facilitate assessment of video quality prior to dynamic resolution determination.

The video quality assessment process can be used to identify any defects or artifacts in individual frames or segments and/or to produce a video quality score for a video stream in real time or in sufficient real time (e.g., within 1-200 ms). In some embodiments, the video quality assessment process can be applied to determine a video quality score for every individual frame of the video stream or every segment of the video stream. In further embodiments, the video quality assessment may detect specific types of defects or artifacts that would benefit from the dynamic resolution switching process. In some implementations, the method can be applied to assess every second/third/fourth/fifth/. . ./$n^{th}$ frame of the video stream or similarly spaced batches of frames or segments. In some embodiments, the method of dynamic resolution switching and the associated video quality assessment can be applied to the entire frame or segment of the video stream. However, in some other implementations, the video quality assessment process can be applied to any number or variety of parts of a set of frames within each segment, which can be consistent from segment to segment or can vary over the segments of the video stream.

Electronic Devices Implementing Embodiments of the Invention

Figure 5:
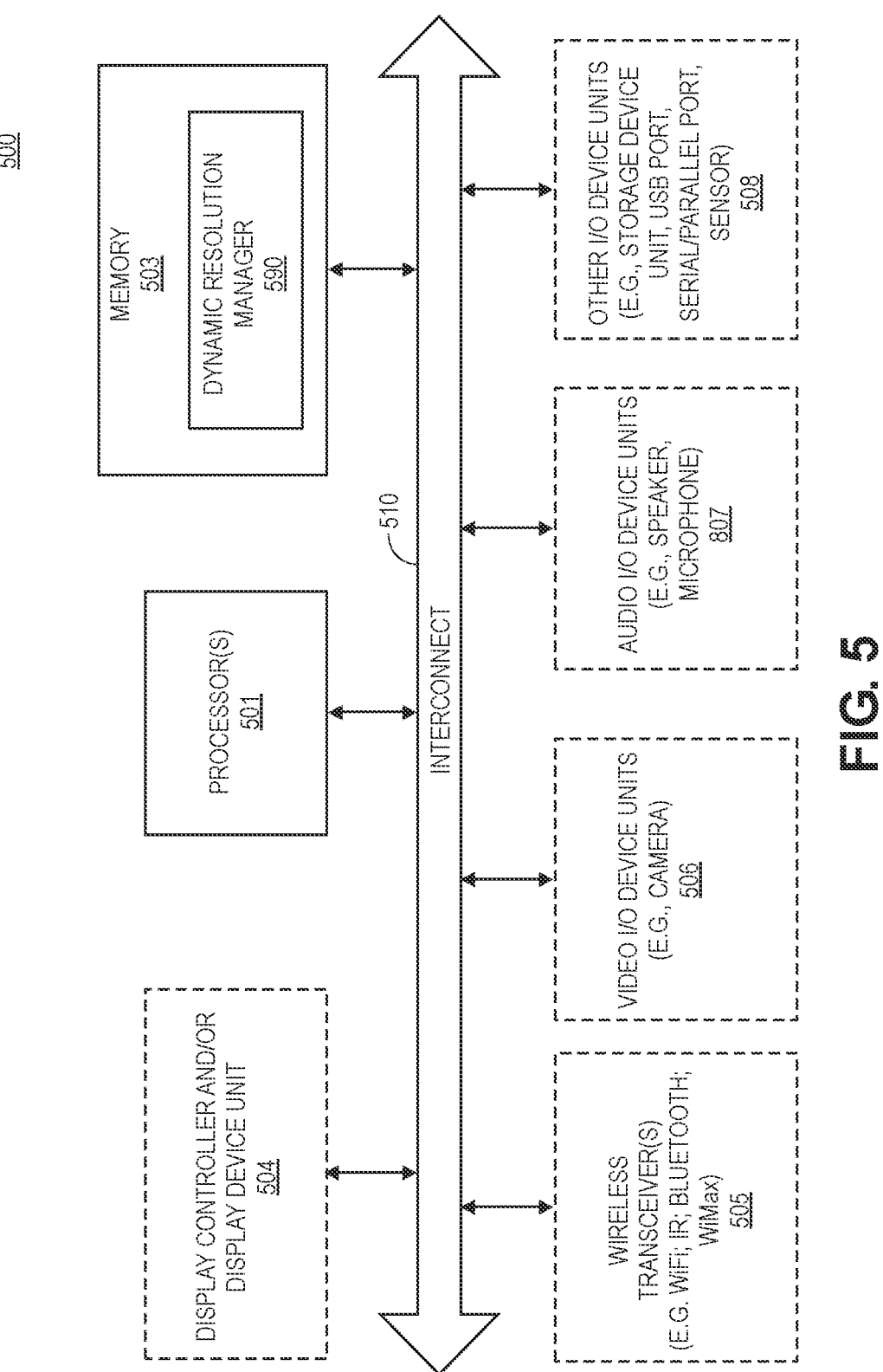
FIG. 5 is a block diagram illustrating an electronic device that may execute a dynamic resolution manager as part of a video streaming platform in a cloud computing environment according to one embodiment of the invention.

FIG. 5 is a block diagram illustrating an electronic device that may serve as a host for the dynamic resolution manager and related components a video streaming platform in a cloud computing environment according to one embodiment of the invention. The electronic device may be a computing device (e.g., a computer server) of a cloud computing environment). The system 500 may represent the dynamic resolution manager 590 and or video quality assessor described above performing any of the processes or methods for dynamic resolution switching for the video streams in real time in a video streaming system described above. The system 500 can include many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that the system 500 is intended to show a high level view of many components of the computing system. However, it is to be understood that additional components may be present in certain implementations and furthermore, different arrangement of the components shown may occur in other implementations.

In one embodiment, the system 500 includes a processor 501, memory 503, and optionally device units 504-508 that are interconnected via a bus or an interconnect 510. A processor 501 may represent a single processor or multiple processors with a single processor core or multiple processor cores included therein. The processor 501 may represent one or more general-purpose processors such as a microprocessor, a central processing unit (CPU), or processing device. More particularly, the processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor 501 may communicate with the memory 503, which in an embodiment can be implemented via multiple memory devices to provide for a given amount of system memory. The memory 503 may include one or more volatile storage (or memory) devices such as random access memory (RAM), dynamic RAM (DRAM), synchronous DRAM (SDRAM), static RAM (SRAM), or other types of storage devices. The memory 503 may store information including sequences of instructions that are executed by the processor 501, or any other device units. For example, executable code and/or data of a variety of operating systems, device drivers, firmware (e.g., input output basic system or BIOS), and/or applications can be loaded in the memory 503 and executed by the processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as Vx Works.

The memory 503 contains a video quality assessor, dynamic resolution manager 590, or related components for the dynamic resolution switching process, which may contain instructions to perform the operations of these components as discussed herein above. The video quality assessor, dynamic resolution manager 590 and related components may contain functional blocks that implement functions as described herein with relation to the video quality assessment process, dynamic resolution switching process, and related processes discussed herein above. The processor 501 may instantiate the video quality assessor, dynamic resolution manager 590 and related components to perform operations to as discussed herein above.

The system 500 may optionally further include input/output (I/O) devices such as the device units 504-508, including display control and/or display device unit 504, wireless transceiver(s) 505, video I/O device unit(s) 506, audio I/O device unit(s) 507, and other I/O device units 508 as illustrated. The wireless transceiver 505 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The system 500 may also include an ultrasound device unit (not shown) for transmitting a conference session code.

The video I/O device unit 506 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. An audio I/O device unit 507 may include a speaker and/or a microphone to facilitate voice-enabled functions, such as voice recognition, voice replication, digital recording, and/or telephony functions. Other optional devices 508 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The optional device units 508 may further include certain sensors coupled to the interconnect 510 via a sensor hub (not shown), while other devices such as a keyboard or thermal sensor may be controlled by an embedded controller (not shown), dependent upon the specific configuration or design of the system 500.

The system 500 may be coupled to an orchestrator in an orchestrator as illustrated in FIG. 2. Additionally, the system 500 may be integrated within a streaming video system 100 illustrated in FIG. 1. The system 500 may perform methods discussed herein above relating to FIGS. 3 and 4.

Note that while the system 500 is illustrated with various components, it is not intended to represent any particular architecture or manner of interconnecting the components; as such details are not germane to embodiments of the present invention. It will also be appreciated that an electronic device having fewer components, or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

It is to be noted that the operations of the flow diagrams are described with reference to the exemplary embodiment electronic devices. However, it should be understood that the operations of flow diagrams can be performed by embodiments of the invention other than those discussed with reference to the electronic devices, and the embodiments discussed with reference to the electronic devices can perform operations different than those discussed with reference to the flow diagrams.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims.

What is claimed is:

1. A method for reducing one or more artifacts in a streaming video implemented by a computing device, the method comprising:

receiving, by one or more processors, a video stream from a video source, wherein the video stream is characterized by a first resolution;

determining, by the one or more processors, a set of features corresponding to one or more video frames of the video stream, wherein the set of features include at least one of: a quantization parameter, a motion vector, a scene cut, a derived parameter, and a preceding video quality score;

generating, by the one or more processors, a video quality score for the one or more video frames based on the set of features;

determining, by the one or more processors, whether dynamic resolution switching of the one or more video frames of the video stream is supported;

in response to determining that the dynamic resolution switching of the one or more video frames of the video stream is supported, evaluating, by the one or more processors, whether the video quality score for the one or more video frames meets a quality threshold; and in response to the one or more video frames failing to meet the quality threshold:

forming, by the one or more processors, a replacement set of video frames characterized by a second resolution that is less than the first resolution;

replacing, by the one or more processors, the one or more video frames with the replacement set of video frames in the video stream; and upscaling, by the one or more processors, the replacement set of video frames to the first resolution.

2. The method of claim 1, further comprising:

determining, using a machine learning model, the video quality score for the one or more video frames.

3. The method of claim 2, wherein the machine learning model determines the video quality score for the one or more video frames based on one or more compression parameters.

4. The method of claim 1, further comprising:

publishing, by the one or more processors, the replacement set of video frames in the video stream to the video source.

5. The method of claim 1, wherein determining whether the dynamic resolution switching of the one or more video frames is supported comprises:

determining, by the one or more processors, whether dynamic resolution management is supported by one or more client applications.

6. The method of claim 1, further comprising:

selecting, by the one or more processors, the second resolution of the replacement set of video frames from a plurality of available resolutions based on the second resolution of the replacement set of video frames having a better video quality score.

7. The method of claim 1, wherein the replacement set of video frames is transcoded from the video source in response to determining that the video quality score falls below the quality threshold.

8. The method of claim 1, wherein the video quality score is generated without reference to an original frame of an input video source.

9. A computer system for reducing one or more artifacts in a streaming video implemented by a computing device, the computer system comprising:

a processor; and a non-transitory computer readable medium having program instructions stored thereon, which, when executed by the processor, cause the computer system to perform operations comprising:

receiving a video stream from a video source, wherein the video stream is characterized by a first resolution;

determining a set of features corresponding to one or more video frames of the video stream, wherein the set of features include at least one of: a quantization parameter, a motion vector, a scene cut, a derived parameter, and a preceding video quality score;

generating a video quality score for the one or more video frames based on the set of features;

determining whether dynamic resolution switching of the one or more video frames of the video stream is supported;

in response to determining that the dynamic resolution switching of the one or more video frames of the video stream is supported, evaluating whether the video quality score for the one or more video frames meets a quality threshold; and in response to the one or more video frames failing to meet the quality threshold:

forming a replacement set of video frames characterized by a second resolution that is less than the first resolution;

replacing the one or more video frames with the replacement set of video frames in the video stream; and upscaling the replacement set of video frames to the first resolution.

10. The computer system of claim 9, wherein when executed by the processor, the program instructions cause the computer system to perform further operations comprising:

determining, using a machine learning model, the video quality score for the one or more video frames.

11. The computer system of claim 10, wherein the machine learning model determines the video quality score for the one or more video frames based on one or more compression parameters.

12. The computer system of claim 9, wherein when executed by the processor, the program instructions cause the computer system to perform further operations comprising:

publishing the replacement set of video frames in the video stream to the video source.

13. The computer system of claim 9, wherein determining whether the dynamic resolution switching of the one or more video frames is supported comprises:

determining whether dynamic resolution management is supported by one or more client applications.

14. The computer system of claim 9, wherein when executed by the processor, the program instructions cause the computer system to perform further operations comprising:

selecting the second resolution of the replacement set of video frames from a plurality of available resolutions based on the second resolution of the replacement set of video frames having a better video quality score.

15. The computer system of claim 9, wherein the replacement set of video frames is transcoded from the video source in response to determining that the video quality score falls below the quality threshold.

16. A non-transitory computer-readable medium comprising one or more sequences of instructions, which, when executed by one or more processors, causes a computing system to perform operations comprising:

receiving, by a computing system, a video stream from a video source, wherein the video stream is characterized by a first resolution;

determining, by the computing system, a set of features corresponding to one or more video frames of the video stream, wherein the set of features include at least one of: a quantization parameter, a motion vector, a scene cut, a derived parameter, and a preceding video quality score;

generating, by the computing system, a video quality score for the one or more video frames based on the set of features;

determining, by the computing system, whether dynamic resolution switching of one or more frames of the video stream is supported;

in response to determining that the dynamic resolution switching of the one or more video frames of the video stream is supported, evaluating, by the computing system, whether the video quality score for the one or more video frames meets a quality threshold; and in response to the one or more video frames failing to meet the quality threshold:

forming, by the computing system, a replacement set of video frames characterized by a second resolution that is less than the first resolution;

replacing, by the computing system, the one or more video frames with the replacement set of video frames in the video stream; and upscaling, by the computing system the replacement set of video frames to the first resolution.

17. The non-transitory computer-readable medium of claim 16, the operations further comprising:

determining, using a machine learning model, the video quality score for the one or more video frames.

18. The non-transitory computer-readable medium of claim 17, wherein the machine learning model determines the video quality score for the one or more video frames based on one or more compression parameters.

19. The non-transitory computer-readable medium of claim 16, the operations further comprising:

publishing, by the computing system, the replacement set of video frames in the video stream to the video source.

20. The non-transitory computer-readable medium of claim 16, wherein determining whether dynamic resolution switching of the one or more frames is supported comprises:

determining, by the computing system, whether dynamic resolution management is supported by one or more client applications.

* * * * *